(12) United States Patent
Fukuda

(10) Patent No.: US 6,553,038 B1
(45) Date of Patent: Apr. 22, 2003

(54) COMMUNICATION SYSTEM

(75) Inventor: Kunio Fukuda, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/237,925

(22) Filed: Jan. 27, 1999

(30) Foreign Application Priority Data

Jan. 30, 1998 (JP) .......................................... 10-020019

(51) Int. Cl.[7] .................................................. H04J 3/16
(52) U.S. Cl. ...................... 370/465; 370/466; 370/467; 370/395.1
(58) Field of Search ........................... 370/395.1, 395.5, 370/395.51, 395.52, 395.53, 395.6, 465, 466, 467, 469, 470, 471, 472, 473

(56) References Cited

U.S. PATENT DOCUMENTS

| | | | |
|---|---|---|---|
| 5,774,461 A | * 6/1998 | Hyden et al. ................ | 370/329 |
| 5,812,612 A | 9/1998 | Saito | |
| 5,819,161 A | 10/1998 | Saito | |
| 6,009,096 A | * 12/1999 | Jaisingh et al. ............. | 370/395 |
| 6,084,888 A | * 7/2000 | Watanabe et al. ........... | 370/473 |
| 6,151,314 A | * 11/2000 | Rauhala ...................... | 370/350 |

* cited by examiner

Primary Examiner—Alpus H. Hsu
Assistant Examiner—Thien D Tran
(74) Attorney, Agent, or Firm—Jay H. Maioli

(57) ABSTRACT

When data transmitted by a predetermined wire transmission path such as an ATM network or the like is wireless-transmitted, a payload serving as user information can be efficiently transmitted. An error detection signal added to header information by a wire transmission path is removed, or repetition of header information is omitted, so that information is formatted for wireless transmission path to be transmitted.

15 Claims, 12 Drawing Sheets

COMMUNICATION SYSTEM

BACKGROUND OF THE INVENTION

The present invention relates to a communication system suitably applied to a case wherein a signal transmitted by, e.g., a predetermined communication network is wireless-transmitted to a mobile station and, more particularly, to a case wherein digital data is transmitted in an asynchronous transfer mode.

As a digital data transmission process, an asynchronous transfer mode (to be referred to as an ATM hereinafter) is known. This ATM asynchronously transmits various digital data. Here, an ATM communication network developed to perform conventional ATM transmission is to perform transmission with a wire transmission path. In addition, the ATM communication network is designed on the assumption that data is transmitted with a high-quality signal line such as an optical fiber cable having small transmission degradation.

In contrast to this, there is a demand that ATM communication should be performed even in mobile communication. For this reason, it is considered that the ATM communication network should be connected to a wireless communication network. FIG. 13 is a view showing an example of a conventional arrangement obtained when end-end communication is performed between a terminal device 1 connected to the ATM communication network and a terminal device 4 connected to a mobile station. The terminal device 1 is connected to an ATM network b with a user-network interface a, and a radio base station 2 for performing wireless communication is connected to the ATM network b with a user-network interface c. A mobile station 3 for performing wireless communication with an air interface d is prepared, and the mobile station 3 is connected to the terminal device 4 with a user-network interface e. The radio base station 2 and the mobile station 3 comprise transmission/reception antennas 2a and 3a, respectively.

The radio base station 2 performs a conversion process between an ATM cell used in the ATM network and a wireless communication format. The mobile station 3 performs a conversion process between the air interface d and the user-network interface e.

Here, an example of an arrangement of an ATM cell serving as a format of a signal transmitted through an ATM network is shown in FIGS. 2 and 3. In transmission in an asynchronous transfer mode, one unit of signal is defined as a signal of a unit called a cell. One unit of ATM cell 100 is constituted by a header information portion 110 and a user information portion 120 as shown in FIG. 2. In this example, one unit of ATM cell 100 consists of 53 bytes. The start header information portion 110 has 5 bytes, and the subsequent user information portion 120 has 48 bytes.

The detail example of the format of one unit of ATM cell 100 is shown in FIG. 3. Four bits of the first octet are bits of generic flow control (GFC) 111, eight bits including four bits of the first octet and four bits of the second octet are bits of virtual path identifiers (VPIs) 112 and 113. Sixteen bits including the second four bits of the second octet to the first four bits of the fourth octet are bits of a virtual channel identifier (VCI) 114, and three bits of the fourth octet are bits of a payload type (PT) 115. One bit of the fourth octet is a bit of a cell loss priority (CLE) 116, and eight bits of the fifth octet are bits of a header error control information (HEC) 117. The arrangement described above is the arrangement of the header information portion 110. Forty-eight bits of the sixth octet to the 53rd octet denote a user information region 120. In this specification, user information transmitted in the user information region is called a payload.

Of the data in the header information portion 110, data for determining a routing of an ATM cell are the virtual path identifiers (VPIs) 112 and 113 and the virtual channel identifier (VCI) 114. An 8-bit (1 byte) header error control information (HEC) 117 is constituted by a cyclic redundancy check (to be referred to as a CRC hereinafter) serving as an error detection signal. The CRC is a code given to be generated from 4-byte header information of the first octet to the fourth octet, and functions to protect the header information in this partition. The header error control information (HEC) 117 also has a cell-synchronization function of specifying the position of a cell in an arbitrary byte string.

In 1-byte information constituting the header error control information (HEC) 117, 4-byte header information of the first octet to the fourth octet is regarded as a 31-order polynomial on the transmission side. The 31-order polynomial is multiplied by $X^8$, the product is divided by a polynomial $X^8+X^2+X+1$ to obtain remainder. A value obtained by adding "01010101" to the remainder is defined as header error control (HEC). On the reception side, "01010101" is added to a value of the header error control (HEC), and the resultant value is divided by the same polynomial as that on the transmission side to obtain a remainder. If the remainder is not 0, it is determined that an error is detected.

As described above, data is transmitted as formatted data through an ATM network. However, in the air interface d shown in FIG. 13, the data must be transmitted in a format for wireless transmission. More specifically, as described above, the ATM network is basically a network used in a state wherein line quality is good, and the header error control (HEC) added to the header information has a very simple arrangement having a small number of bits as an error correction code. The payload transmitted in the user information region is transmitted without adding an error detection code to the payload. In contrast to this, when data is transmitted by a radio circuit, a transmission error is probably generated for various factors. The data must be transmitted while an error detection code having check capability which is high to some extent is added to the data. In the radio base station 2, format conversion is made to add the error detection code to the data.

An example of a signal wireless-transmitted between the radio base station 2 and the mobile station 3 is shown in FIG. 14. Referring to FIG. 14, a case wherein data transmission is performed by using a slot having a predetermined fixed length in a time division multiplex access (TDMA) scheme. In this example, data of one ATM cell is allocated to one slot 200. In the slot 200, one slot consists of 67 bytes, and a 4-byte preamble (PR) 201 for slot synchronization, a 4-byte unique word (UW) 202 representing the start of data, and a 2-byte control signal (CAC) 203 are sequentially arranged. The subsequent 53-byte partition is defined as a user information partition. In this example, a 5-byte header information portion 204 of the ATM cell and a 48-byte ATM payload 205 are arranged. As the 5-byte header information portion 110 and the 48-byte ATM payload 205, the 5-byte header information portion 204 and the 48-byte payload 120 shown in FIG. 3 are directly arranged. An error detection code 206 (CRC) is added to the last four bytes of the slot 200. The error detection code 206 is a code generated for data of a partition ranging from the control signal (CAC) to the ATM payload. As the code, a code having relatively high check capability is used.

The example in FIG. 14 is obtained when data of one ATM cell can be arranged in a user information partition of one slot. However, the length of one slot may be shortened, and the data of one ATM cell may be wireless-transmitted. FIG. 15 is a view showing an example of this case. In this example, two slots 210 and 220 each having a slot length of 50 bytes are used. In the slots 210 and 220, from the start, 4-byte preambles (PRs) 211 and 221, 4-byte unique words (UWs) 212 and 222, and 4-byte control signals (CACs) 213 and 223 are sequentially arranged. In a 36-byte user information partition, a 5-byte ATM header 214 of the first cell is arranged. An ATM payload 215 of the first cell is arranged as the remaining 31 bytes. At this time, since the payload of one ATM cell has 48 bytes, the remaining 17 bytes of the payload of the first cell are arranged as an ATM payload 224 of the first cell at the start portion of the user information partition of the next slot 220. An ATM header 225 of the next cell (second cell) and a 14-byte ATM payload 226 of the second cell are arranged at the remaining portion of the user information partition of the slot 220. The remaining payload of the second cell is arranged in the user information partition (not shown) of the next slot. Error correction codes (CRCs) 216 and 227 are arranged as the last four bytes of the slots 210 and 220, respectively.

As described above, in any cases, the header information and payload of the ATM cell are constituted such that all the data are directly wireless-transmitted.

However, it is not preferable in data transmission efficiency that header information of a cell to be transmitted through an ATM network is directly arranged and transmitted to a slot in wireless transmission. More specifically, the header information is originally used for control, and is added to correctly transmit the payload. On the other hand, a slot or the like determined by a wireless transmission format is designed to transmit control information. For example, in the slot arrangements shown in FIGS. 14 and 15, preambles PR, unique words UW, and both of control information for slot transmission of the control signal CAC and ATM headers are transmitted. In the arrangement, control information is duplex-transmitted. As described above, when many pieces of control information must be transmitted, a capacity being capable of transmitting a payload serving as actual user information decreases.

SUMMARY OF THE INVENTION

The present invention has been made in consideration of the above circumstances, and has as its object to efficiently transmit a payload serving as user information when data transmitted by a predetermined wire transmission path such as an ATM network is wireless-transmitted.

According to the first aspect of the present invention, there is provided a communication system constituted by a transmission device and a reception device, wherein the transmission device comprises: first reception means for receiving a transmission signal of a first data amount unit of a first format including first header information including a first error correction signal and first user information transmitted by a first transmission path; when information obtained by removing the first error correction signal from the first header information of the transmission signal of the first format received by the first reception means is used as second header information, and the first user information itself is used as a second user information, transmission signal generation means for generating a transmission signal of a second format by adding a second error correction signal serving as an error correction signal for a signal of a second data amount unit to the signal of the second data amount unit including at least one of the second header information and the second user information; and transmission means for transmitting the transmission signal of the second format to a second transmission path, and the reception device comprises: second reception means for receiving the transmission signal of the second format transmitted by the second transmission path; error correction means for performing error correction for the signal of the second data amount unit on the basis of the second error correction signal included in the transmission signal of the second format received by the second reception means; error correction signal generation means for generating a third error correction signal serving as an error correction signal for the second header information corrected by the error correction means; and transmission signal generation means for generating the transmission signal of the first format from header information including the third error correction signal and the second user information.

According to the second aspect of the present invention, there is provided a transmission device comprises: first reception means for receiving a transmission signal of a first data amount unit of a first format including first header information including a first error correction signal and first user information transmitted by a first transmission path; when information obtained by removing the first error correction signal from the first header information of the transmission signal of the first format received by the first reception means is used as second header information, and the first user information itself is used as a second user information, transmission signal generation means for generating a transmission signal of a second format by adding a second error correction signal serving as an error correction signal for a signal of a second data amount unit to the signal of the second data amount unit including at least one of the second header information and the second user information; and transmission means for transmitting the transmission signal of the second format to a second transmission path.

According to the third aspect of the present invention, there is provided a reception device for receiving a transmission signal of a second format from a transmission device which comprises: first reception means for receiving a transmission signal of a first data amount unit of a first format including first header information including a first error correction signal and first user information transmitted by a first transmission path; when information obtained by removing the first error correction signal from the first header information of the transmission signal of the first format received by the first reception means is used as second header information, and the first user information itself is used as a second user information, transmission signal generation means for generating the transmission signal of the second format by adding a second error correction signal serving as an error correction signal for a signal of a second data amount unit to the signal of the second data amount unit including at least one of the second header information and the second user information; and transmission means for transmitting the transmission signal of the second format to a second transmission path, comprising: second reception means for receiving the transmission signal of the second format transmitted by the second transmission path; error correction means for performing error correction for the signal of the second data amount unit on the basis of the second error correction signal included in the transmission signal of the second format received by the second reception means; error correction signal generation means for generating a third error correction signal serving as an error correction signal for the second header information corrected by the error correction means; and transmission signal generation means for generating the transmission signal of the first format from header information including the third error correction signal and the second user information.

According to the fourth aspect of the present invention, there is provided a communication method between a transmission device and a reception device, comprising the steps of: causing the transmission device to receive a transmission signal of a first data amount unit of a first format including first header information including a first error correction signal and first user information transmitted by a first transmission path; causing the transmission device, when information obtained by removing the first error correction signal from the first header information of the transmission signal of the first format received by the first reception means is used as second header information, and the first user information itself is used as a second user information, to generate a transmission signal of a second format by adding a second error correction signal serving as an error correction signal for a signal of a second data amount unit to the signal of the second data amount unit including at least one of the second header information and the second user information; transmitting the transmission signal of the second format from the transmission device to a second transmission path; causing the reception device to receive the transmission signal of the second format transmitted by the second transmission path; causing the reception device to perform error correction for the signal of the second data amount unit on the basis of the second error correction signal included in the transmission signal of the second format received by the second reception means; causing the reception device to generate a third error correction signal serving as an error correction signal for the second header information corrected by the error correction means; and causing the reception device to generate the transmission signal of the first format from header information including the third error correction signal and the second user information.

According to the fifth aspect of the present invention, there is provided a transmission device comprising: a reception unit for receiving a signal obtained by transmitting header information and user information as a signal of a first format by a first wire transmission path; a determination unit for determining that the same header information is repeated every predetermined unit by the reception unit; transmission data generation unit for arranging the header information and the user information received by the reception unit in a user information partition of a second format being appropriate for a second wireless transmission path to generate transmission data, and omitting the second and subsequent arrangements of the same header information when the determination unit determines the repetition of the same header information; and a transmission unit for transmitting the transmission data generated by the transmission data generation unit to the second transmission path.

DETAILED DESCRIPTION OF THE PREFERRED EMBODIMENT

An embodiment of the present invention will be described below with reference to FIGS. 1 to 7.

Figure 1:
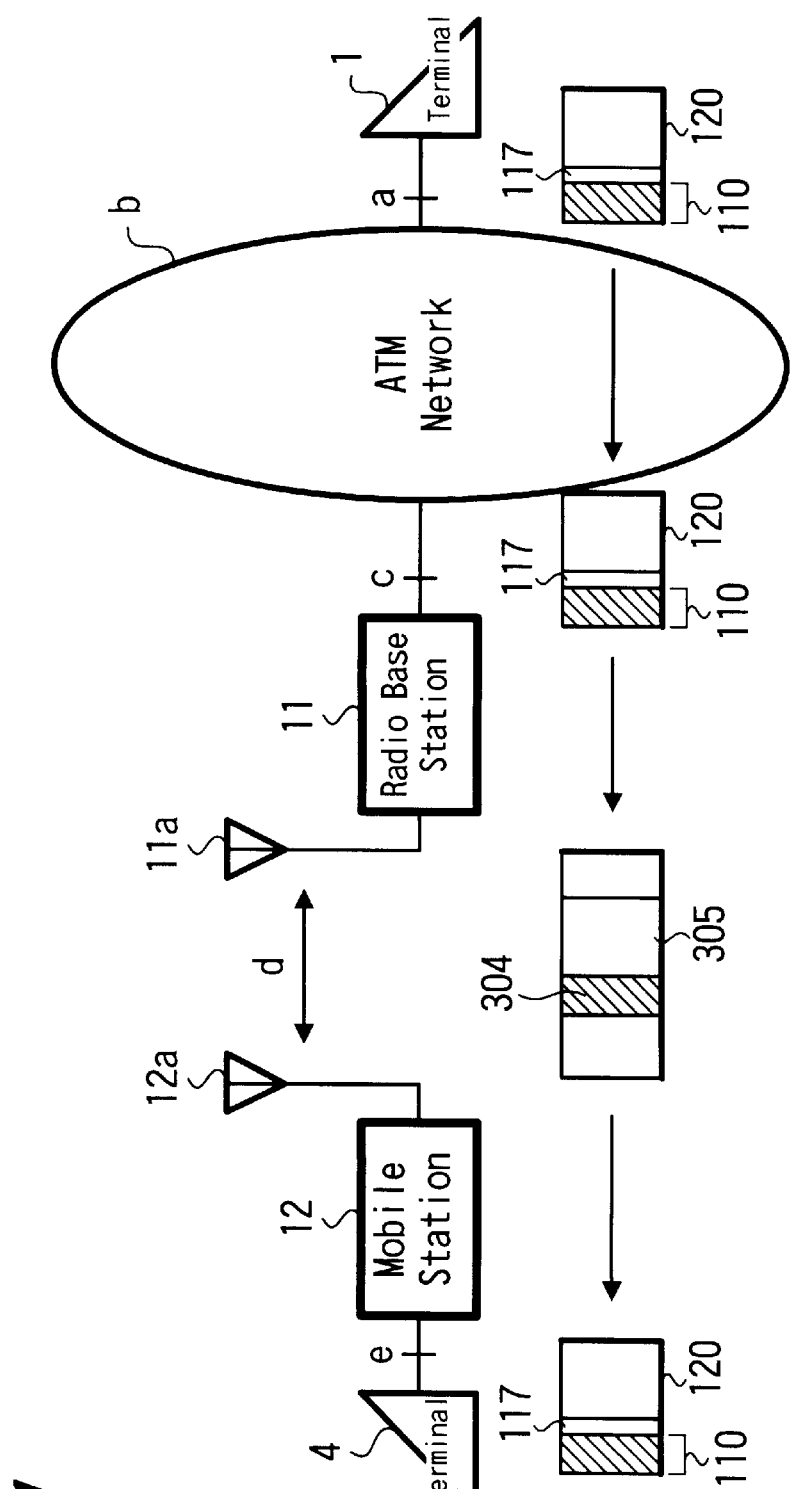
FIG. 1 is a block diagram showing a communication arrangement according to the first embodiment of the present invention.

In this embodiment, an ATM communication network in which communication is performed in an asynchronous transfer mode is connected to a wireless communication network. This transmission arrangement is shown in FIG. 1. A case shown in FIG. 1 is obtained when end-end communication is performed between a terminal device 1 connected to the ATM communication network and a terminal device 4 connected to a mobile station. The terminal device 1 is connected to an ATM network b by a user-network interface a, and a radio base station 11 for performing wireless communication is connected to the ATM network b by a user-network interface c. A mobile station 12 for performing wireless communication with the radio base station 11 by an air interface d is prepared, and the mobile station 12 is connected to the terminal device 4 by a user-network interface e. The radio base station 11 and the mobile station 12 comprise transmission/reception antennas 12a and 13a, respectively.

Figure 2:
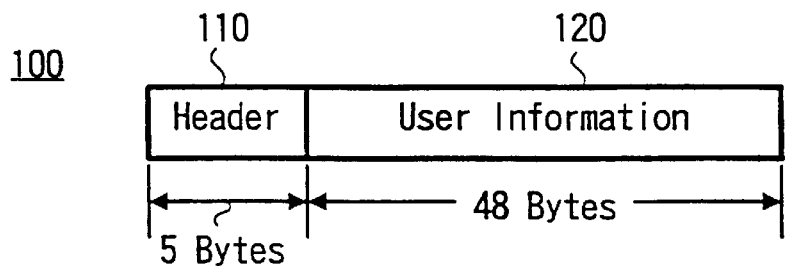
FIG. 2 is a view for explaining the structure of an ATM cell.

As a signal transmitted through the ATM network b, a signal having a cell structure is used. The cell structure to be transmitted through the ATM network of this embodiment is the same as the conventional cell structure shown in FIGS. 2 and 3. The structures will be described below. An ATM cell 100 of one unit is constituted by a header information portion 110 and a user information portion 120 as shown in FIG. 2. In this embodiment, the ATM cell 100 of one unit consists of 53 bytes, the header information portion 110 at the start has 5 bytes, and the subsequent user information portion 120 has 48 bytes.

Figure 3:
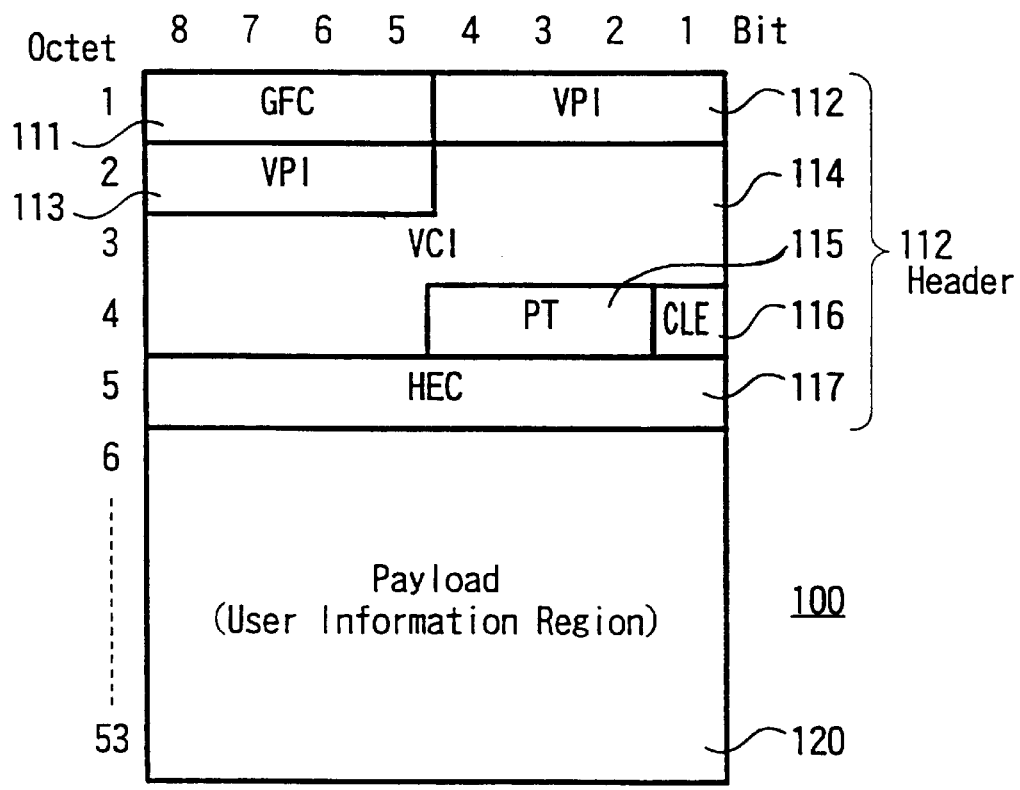
FIG. 3 is a view for explaining an ATM cell format.

In the format of the ATM cell 100 of one unit, as shown in FIG. 3, four bits of the first octet are bits of generic flow control (GFC) 111, eight bits including four bits of the first octet and four bits of the second octet are bits of virtual path identifiers (VPIs) 112 and 113. Sixteen bits including the second four bits of the second octet to the first four bits of the fourth octet are bits of a virtual channel identifier (VCI) 114, and three bits of the fourth octet are bits of a payload type (PT) 115. One bit of the fourth octet is a bit of a cell loss priority (CLE) 116, and eight bits of the fifth octet are bits of a header error control information (HEC) 117. The arrangement described above is the arrangement of the header information portion 110. Forty-eight bits of the sixth octet to the 53rd octet denote a user information region 120, and a payload serving as user information is transmitted.

The header error control information (HEC) 117, as has been described in the prior art, is constituted by a CRC serving as an error detection signal. The header error control information (HEC) 117 is a code generated by the 4-byte header information from the first octet to the fourth octet to be added, and serves as a protector for the header information in this partition.

Figure 4:
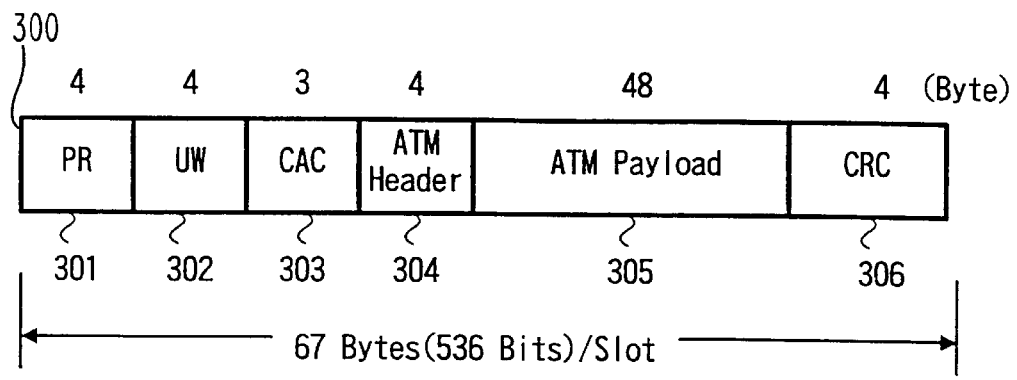
FIG. 4 is a view for explaining a slot format in the first embodiment of the present invention.
Figure 5:
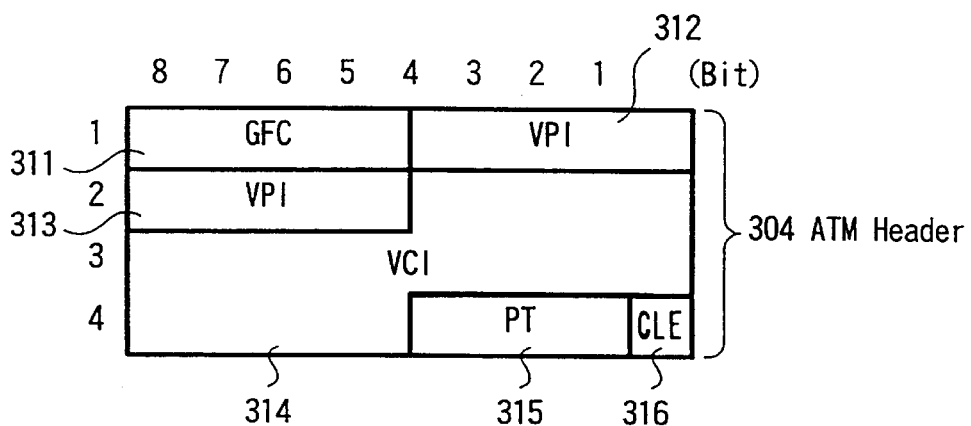
FIG. 5 is a view for explaining the arrangement of an ATM header in a slot in the first embodiment of the present invention.

When the signals of the ATM cells arranged as described above are converted into signals for wireless transmission by the radio base station 11, the signals are converted into signals having the slot arrangements shown in FIGS. 4 and 5. Here, wireless transmission between the radio base station 11 and the mobile station 12 is performed such that a slot having a predetermined fixed length is time-divisionally transmitted by a time division multiplex access (TDMA) scheme. FIG. 4 is a view showing the arrangement of one slot. In the slot 300, one slot consists of 67 bytes, and a 4-byte preamble (PR) 301 for slot synchronization, a 4-byte unique word (UW) 302 representing the start of data, and a 3-byte control signal (CAC) 303 are sequentially arranged. The subsequent 52-byte partition is defined as a user information partition. In this example, a 4-byte header information portion 304 of the ATM cell and a 48-byte ATM payload 305 are arranged. An error detection signal (CRC) 306 is added to the last four bytes of the slot 300. This error detection signal 306 is a code generated for data of a partition ranging from the control signal (CAC) 303 to the ATM payload 305. As the code, an error detection code having relatively high check capability (or error correction code: the detection code and the correction code are simply called error detection signals in this specification) is used.

The 48-byte ATM payload 305 arranged in the user information partition of the slot 300 has a data amount equal to that of the 48-byte payload 120 of the ATM cell shown in FIGS. 2 and 3, and is directly arranged. In contrast to this, although the header information of an ATM cell transmitted through the ATM network has 5 bytes, the number of bytes of the 4-byte header information portion 304 of the ATM cell arranged in a user information partition 307 of the slot 300 is reduced by one byte.

FIG. 5 is a view showing the arrangement of the 4-byte header information portion 304 of the ATM cell arranged in the user information partition 307 of the slot 300. In the 5-byte header information portion 110 of the ATM cell transmitted through the ATM network, the header error control information (HEC) 117 of the fifth octet is omitted, and other header information is arranged in the original array. More specifically, in the header information portion 304 of the ATM cell, four bits of the first octet are bits of generic flow control (GFC) 311, eight bits including four bits of the first octet and four bits of the second octet are bits of virtual path identifiers (VPIs) 312 and 313. Sixteen bits including the second four bits of the second octet to the first four bits of the fourth octet are bits of a virtual channel identifier (VCI) 314, and three bits of the fourth octet are bits of a payload type (PT) 315. One bit of the fourth octet is a bit of a cell loss priority (CLE) 316.

Figure 6:
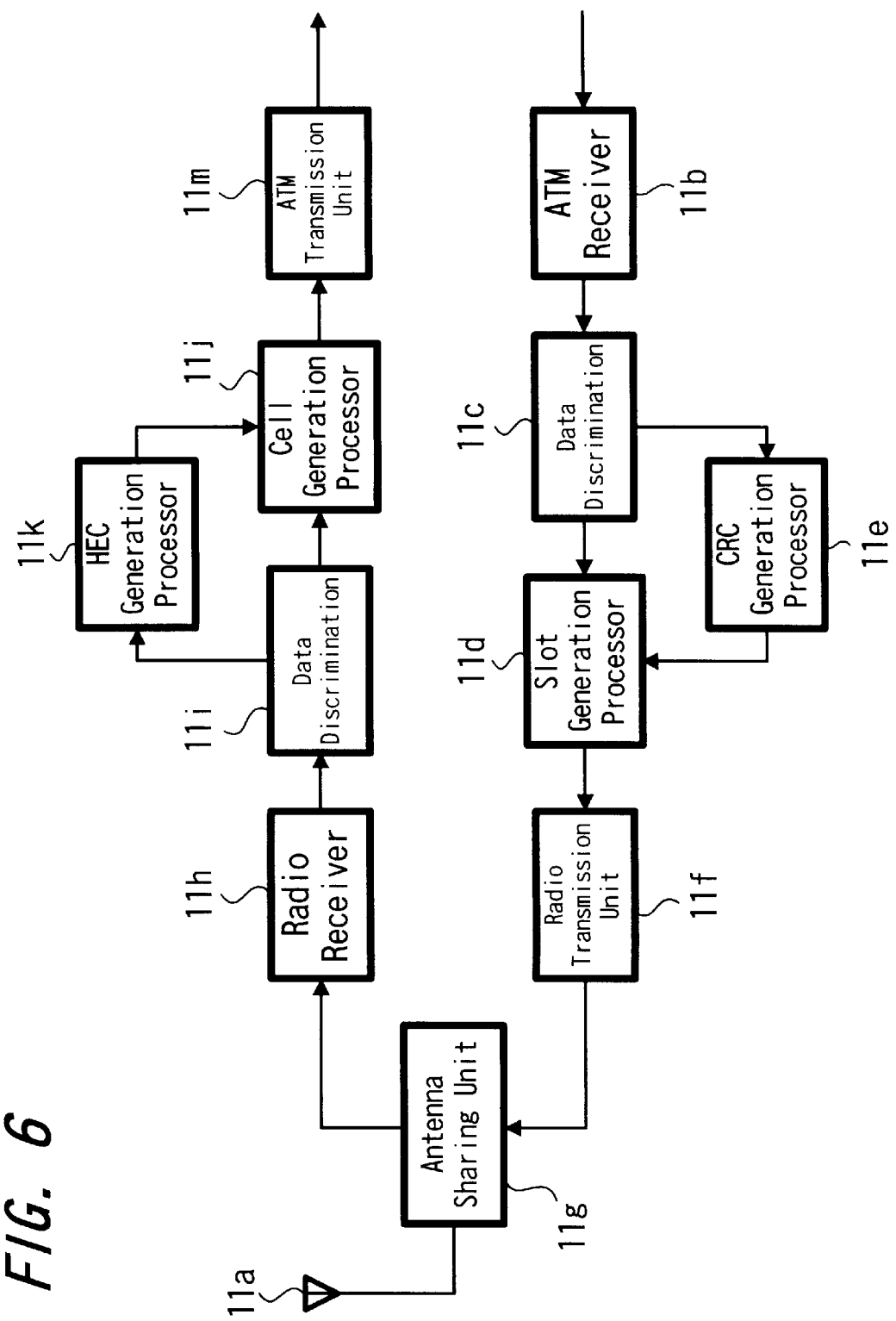
FIG. 6 is a block diagram showing the arrangement of a radio base station according to the first embodiment of the present invention.

The arrangement of the radio base station 11 for performing a conversion process between data having the cell structure of the ATM network arranged as described above and the data having a slot arrangement for wireless transmission will be described below with reference to FIG. 6. A signal having a cell structure and supplied from the ATM network by the user-network interface c is received by an ATM receiver 11b, and a data discrimination unit 11c discriminates header information from a payload on the basis of the signal having the cell structure. At this time, the data discrimination unit 11c performs an error detection process of header information on the basis of header error control information (HEC) added to the header information. When the error is detected, the data discrimination unit 11c performs a correction process for a corresponding bit.

The header information and the payload discriminated by the data discrimination unit 11c are supplied to a slot generation processor 11d. The slot generation processor 11d performs the process of generating data of a data array having the slot arrangement shown in FIGS. 4 and 5 on the basis of the header information and the payload. In this case, when an arithmetic operation process based on the header information and payload discriminated by the data discrimination unit 11c, control information added by the slot generation processor 11d, and the like is performed, a CRC generation processor 11e generates an error detection signal to supply the generated error detection signal to the slot generation processor 11d. The slot generation processor 11d arranges the error detection signal supplied from the CRC generation processor 11e in the partition of the error detection signal (CRC) 306 consisting of last four bytes of each slot. The slot generated by the slot generation processor 11d is supplied to a wireless transmission processor 11f, processed to wireless-transmit the slot at a predetermined frequency and a timing, and then wireless-transmitted from an antenna 11a connected through an antenna sharing unit 11g.

A radio receiver 11h connected to the antenna 11a through the antenna sharing unit 11g receives a radio signal having a predetermined frequency at a predetermined timing. Data included in the radio signal received by the radio receiver 11h is discriminated by a data discrimination unit 11i. At this time, the data discrimination unit 11i performs an error detection process on the basis of the error detection signal (CRC) 306 added to each slot. When an error is detected, the data discrimination unit 11i performs a correction process for a corresponding bit. The header information and the payload in the user information partition discriminated by the data discrimination unit 11i are supplied to a cell generation processor 11j, and the process of generating a cell for ATM network is performed. The cell generation processor 11j arranges the supplied header information and the supplied payload in the corresponding partitions 110 and 120 in the cell structure, respectively. In this case, the header information discriminated by the data discrimination unit 11i is supplied to an HEC generation processor 11k, 1-byte header error control information (HEC) is generated, and the generated header error control information is supplied to the cell generation processor 11j to be arranged in the corresponding partition 117 of the ATM cell. The ATM cell generated by the cell generation processor 11j is supplied to an ATM transmission processor 11m and subjected to the process of transmitting the ATM cell through an ATM network.

Figure 7:
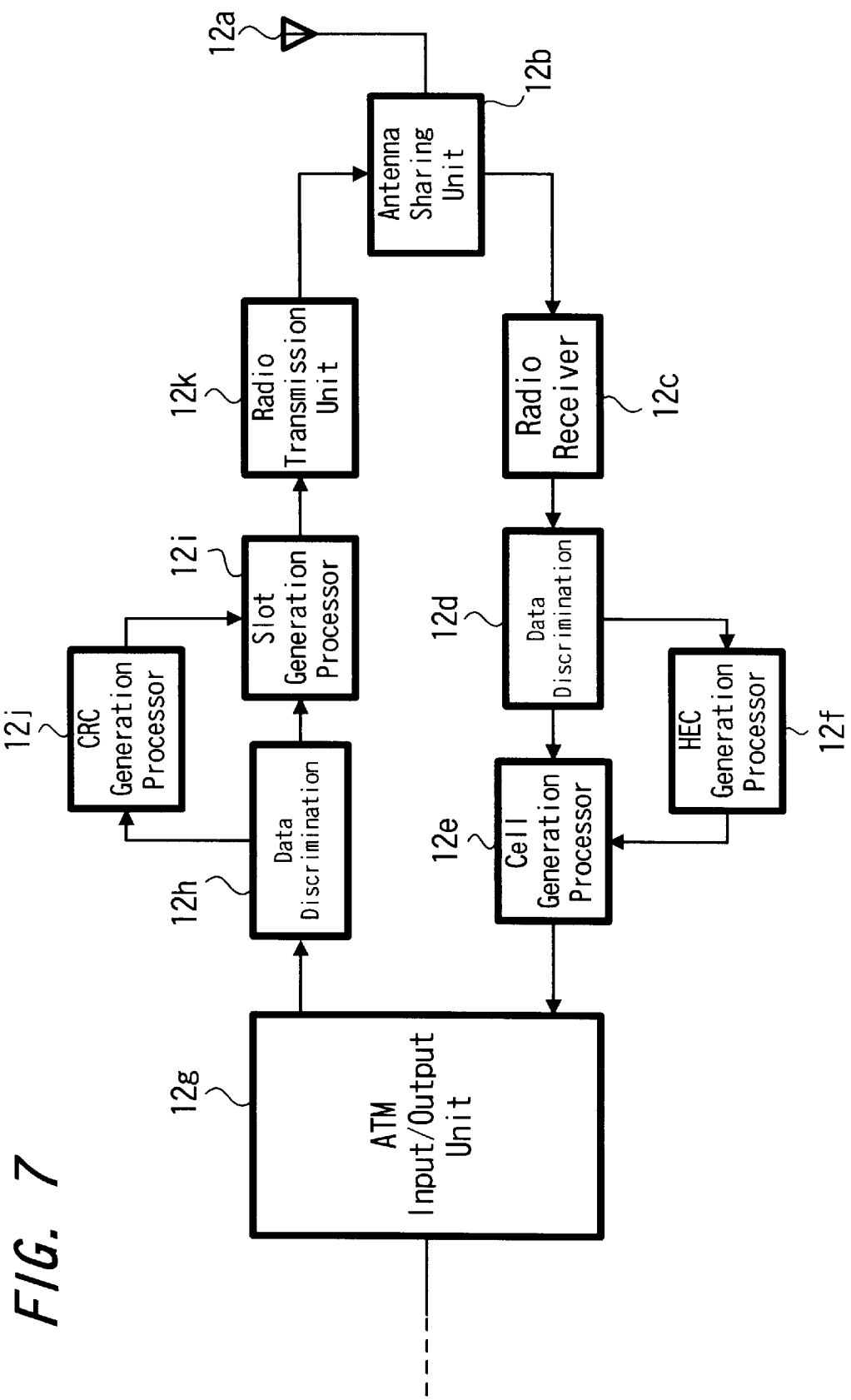
FIG. 7 is a block diagram showing the arrangement of a mobile station according to the first embodiment of the present invention.

The arrangement of the mobile station 12 will be described below with reference to FIG. 7. A terminal device 4 used to connect the mobile station 12 to the ATM network is connected to the mobile station 12 of this embodiment. In this mobile station 12, a radio receiver 12c connected to an antenna 12a through an antenna sharing unit 12b receives a radio signal having a predetermined frequency at a predetermined timing. Data included in the received signal is subjected to a discrimination process by the data discrimination unit 12d to discriminate data in reception slots. At this time, the data discrimination unit 12d performs an error detection process on the basis of the error detection signal (CRC) 306 added to each slot. When an error is detected, the data discrimination unit 12d performs a correction process for a corresponding bit. The header information and the payload in the user information partition discriminated by the data discrimination unit 12d are supplied to a cell generation processor 12e, and the process of generating a cell for ATM network is performed. The cell generation processor 12e arranges the supplied header information and the supplied payload in the corresponding partitions 110 and 120 in the cell structure, respectively. In this case, the header information discriminated by the data discrimination unit 12d is supplied to an HEC generation processor 12f, and 1-byte header error control information (HEC) is generated. The generated header error control information is supplied to the cell generation processor 12e to be arranged in the corresponding partition 117 of the ATM cell. The ATM cell generated by the cell generation processor 12e is supplied to an ATM input/output unit 12g and supplied as data (data in asynchronous transfer mode) having a cell arrangement transmitted to the connected terminal device 4 through the ATM network.

Data (data in asynchronous transfer mode) having a cell structure for ATM network supplied from the terminal device 4 to the ATM input/output unit 12g of the mobile station 12 is supplied to a data discrimination unit 12h, and header information and a payload are discriminated on the basis of the cell arrangement. The header information and the payload discriminated by the data discrimination unit 12h are supplied to a slot generation processor 12i. The slot generation processor 12i performs the process of generating data of a data array having the slot arrangement shown in FIGS. 4 and 5. In this case, when an arithmetic operation process based on the header information and payload discriminated by the data discrimination unit 12h, control information added by the slot generation processor 12i, and the like is performed, a CRC generation processor 12j generates an error detection signal to supply the generated error detection signal to the slot generation processor 12i. The slot generation processor 12i arranges the error detection signal supplied from the CRC generation processor 12j in the partition of the error detection signal (CRC) 306 consisting of last four bytes of each slot. The slot generated by the slot generation processor 12i is supplied to a wireless transmission processor 12k, processed to wireless-transmit the slot at a predetermined frequency and a timing, and then wireless-transmitted from an antenna 12a connected through the antenna sharing unit 12b.

A signal having a cell structure transmitted through an ATM network between the radio base station 11 and the mobile station 12 arranged as described above is converted into a signal having a slot structure for wireless transmission, and is transmitted from the terminal device 1 to the terminal device 4. The signal having the slot structure for wireless transmission is converted into a signal having a cell structure transmitted through an ATM network, and the resultant signal is also transmitted from the terminal device 4 to the terminal device 1.

For example, the outline of the signal transmitted from the terminal device 1 to the terminal device 4 is shown in the lower side of FIG. 1. A signal having a cell structure transmitted from the terminal device 1 includes the header information 110 and the payload 120 including the header error control information (HEC) 117, and the signal is directly received by the radio base station 11. A signal having a slot arrangement wireless-transmitted from the radio base station 11 to the mobile station 12 includes the ATM header information 304 except for header error control information (i.e., error detection signal) and the ATM payload 305. In the mobile station 12, the header error control information (HEC) 117 is restored by an arithmetic operation process, and a signal having the original cell arrangement constituted by the header information 110 and the payload 120 including the header error control information (HEC) 117 is supplied to the terminal device 4. In transmission from the terminal device 4 to the terminal device 1, the process opposite to the above process is performed.

In this embodiment, in the user information partition of the slot for wireless transmission, information obtained by removing the header error control information (HEC) from the header information for ATM network is set. For this reason, the information amount of header information in wireless transmission can be reduced by the amount of header error control information (HEC). In this embodiment, since the header error control information (HEC) consists of one byte, when one ATM cell is arranged in one slot, 1-byte header information can be reduced. Therefore, an amount of other information than the payload required to transmit the payload can be reduced by the 1-byte header information. A transmission rate of the payload becomes relatively high, and wireless transmission efficiency is improved. In this case, the partition for an error detection signal (CRC) 308 is prepared for the slot for wireless transmission, and error correction can also be performed to the header information by the error detection signal on the reception side, and an inconvenience is not caused by removing the error detection signal of the header information.

When the mobile station 12 receives a radio signal, the header error control information (HEC) is restored by an arithmetic operation process to make the cell arrangement to return to the cell arrangement for ATM network, and reception data is supplied to the connected terminal device 4. For this reason, the terminal device 4 connected to the mobile station 12, a device to be connected to the ATM network can be directly used. A special interface or the like for connecting the terminal device 4 to the mobile station 12 is not required.

In this embodiment, although signals of one ATM cell are arranged in one slot to be wireless-transmitted, the signals in one ATM cell may be distributively arranged in a plurality of slots to be wireless-transmitted.

Another embodiment of the present invention will be described below with reference to FIGS. 8 to 11. The same reference numerals as in FIG. 1 to FIG. 7 described in the first embodiment denote the same parts in FIGS. 8 to 11 for illustrating the second embodiment, and a description thereof will be omitted.

Figure 8:
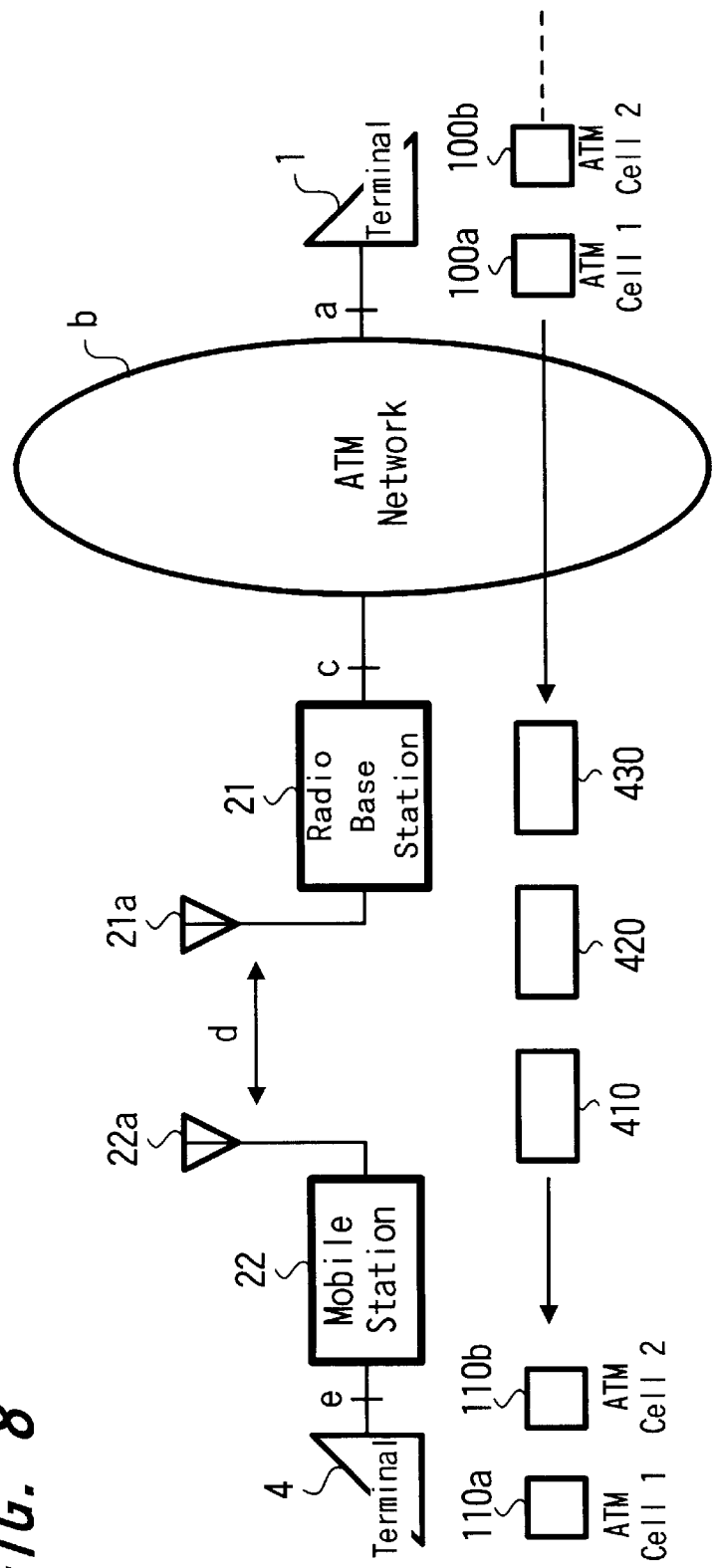
FIG. 8 is a block diagram showing a communication arrangement according to the second embodiment of the present invention.

In this embodiment, as in the first embodiment, an ATM communication network in which communication is performed in an asynchronous transfer mode is connected to a wireless communication network. The transmission arrangement of the second embodiment is shown in FIG. 8. A case shown in FIG. 8 is obtained when end-end communication is performed between a terminal device 1 connected to the ATM communication network and a terminal device 4 connected to a mobile station. The terminal device 1 is connected to an ATM network b by a user-network interface a, and a radio base station 21 for performing wireless communication is connected to the ATM network b by a user-network interface c. A mobile station 22 for performing wireless communication with the radio base station 21 by an air interface d is prepared, and the mobile station 22 is connected to the terminal device 4 by a user-network interface e. The radio base station 21 and the mobile station 22 comprise transmission/reception antennas 22a and 23a, respectively.

As a signal transmitted through the ATM network b, a signal having a cell structure is used. The cell structure to be transmitted through the ATM network of this embodiment is the same as that of the first embodiment described above, and is shown in FIGS. 2 and 3.

Figure 9:
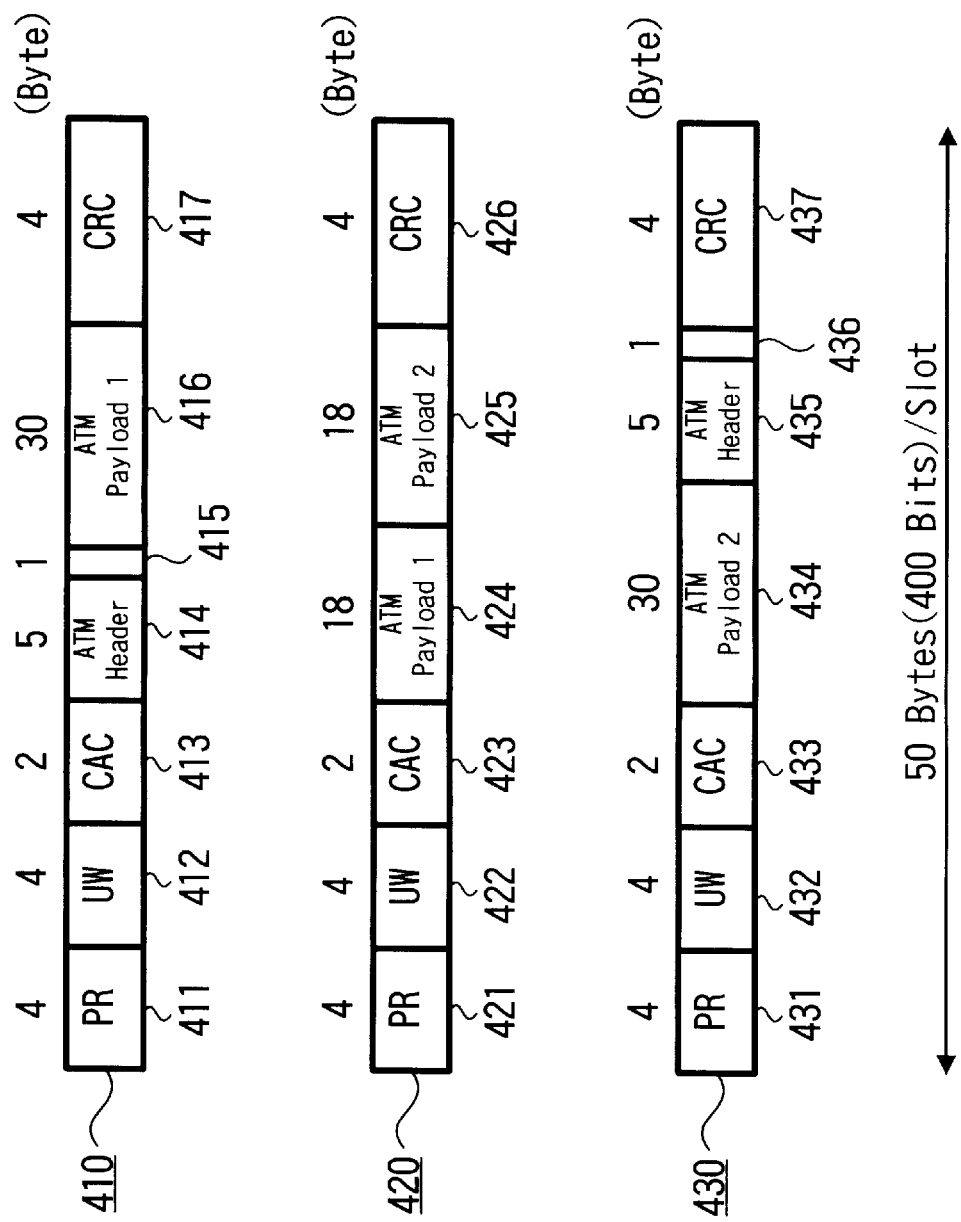
FIG. 9 is a view for explaining a slot format in the second embodiment of the present invention.

As a signal wireless-transmitted between the radio base station 21 and the mobile station 22, a signal having a slot arrangement shown in FIG. 9 is used. Here, in wireless transmission between the radio base station 21 and the mobile station 22, an arrangement for transmitting a slot having a fixed length by a time division multiplex access (TDMA) scheme. FIG. 9 is a view showing the arrangement of each slot. Slots 410, 420, and 430 consist of 50 bytes each. In the slots 410, 420, and 430, 4-byte preambles (PRs) 411, 421, and 431 for slot synchronization, 4-byte unique words (UWs) 412, 422, and 432 representing the starts of data, and 2-byte control signals (CACs) 413, 423, and 433 are sequentially arranged. The subsequent 36-byte partition is defined as a user information partition. Error detection signals (CRCS) 417, 426, and 437 are added to the last four bytes of the slots. The error detection signals are signals generated by an arithmetic operation for control signals (CACs) and data of the user information partitions to be added.

As data arranged in the user information partition, in addition to a header information portion of a 5-byte ATM cell and a 48-byte payload, a 1-byte payload count data representing a repetition count of the header information portion is added. More specifically, FIG. 9 illustrates a case wherein two ATM cells (first and second cells) have pieces of consecutive header information having the same contents. In this case, in the user information partition of the first slot 410, 5-byte header information 414 of the first cell is arranged, and a payload count 415 serving as information representing a period in which pieces of header information are consecutive is arranged. A first-half portion 416 of the payload of the first cell is arranged in the remaining partition.

In the user information period of the next slot 420, a second-half portion 424 of the payload of the first cell and a first-half portion 425 of the payload of the second cell are arranged. A second-half portion 434 of the payload of the second cell is arranged in the user information partition of the next slot 430. The header information of the second cell is not arranged before the payload of the second cell. Header information 435 of the next cell (third cell) and a payload count 436 are arranged in the remaining portion of the user information partition of the slot 430.

The arrangement of the radio base station 21 for performing a conversion process between data having a cell arrangement of the ATM network arranged as described above and data having a slot arrangement for wireless transmission will be described below with reference to FIG. 10. A signal having a cell structure supplied from the ATM network by the user-network interface c is received by a ATM receiver 21b. On the basis of the received signal, a data discrimination unit 21c discriminates header information and a payload. At this time, the data discrimination unit 21c performs an error detection process of header information on the basis of header error control information (HEC) added to the header information. When an error is detected, the data discrimination unit 21c performs a correction process of a corresponding bit.

The header information and the payload discriminated by the data discrimination unit 21c are supplied to a slot generation processor 21d. The slot generation processor 21d performs the process of generating data of a data array having the slot arrangement shown in FIG. 9 described above. In this case, when an arithmetic operation process based on the header information and payload discriminated by the data discrimination unit 21c, control information added by the slot generation processor 21d, and the like is performed, a CRC generation processor 21e generates an error detection signal to supply the generated error detection signal to the slot generation processor 21d. The slot generation processor 21d arranges the error detection signal in the partition of the error detection signal (CRC) consisting of last four bytes of each slot. In this embodiment, the radio base station 21 comprises a header repetition discrimination unit 21f for discriminating repetition of the header information discriminated by the data discrimination unit 21c. The repetition count data discriminated by the discrimination unit 21f is supplied to the slot generation processor 21d to be used as payload count data arranged in the slot. If it is determined on the basis of the payload count data that the header having the same contents is repeated twice or more, the slot generation processor 21d performs the process of omitting arrangement of the second and subsequent header information in the slot.

The slot generated by the slot generation processor 21d is supplied to a wireless transmission processor 21g, and the process of wireless-transmitting the slot at a predetermined frequency and a timing is performed. The slot is wireless-transmitted from an antenna 21a connected through an antenna sharing unit 21h.

A radio receiver 21i connected to the antenna 21a through the antenna sharing unit 21h receives a radio signal having a predetermined frequency at a predetermined timing. Data included in the received signal is subjected to a discrimination process by a data discrimination unit 21j to discriminate data in reception slots. At this time, the data discrimination unit 21j performs an error detection process on the basis of an error detection signal (CRC) added to each slot. When an error is detected, the data discrimination unit 21j performs a correction process for a corresponding bit. The header information and the payload in the user information partition discriminated by the data discrimination unit 21j are supplied to a cell generation processor 21k, and the process of generating a cell for ATM network is performed. If the payload count discriminated by the data discrimination unit 21j is 2 or more, the data discrimination unit 21j adds header information whose number is equal to the repetition count indicted by the data to the payloads to supply the resultant payloads to the cell generation processor 21k.

The cell generation processor 21k arranges the supplied header information and payload in the corresponding partitions 110 and 120 in the cell structure, respectively. The ATM cell generated by the cell generation processor 21k is supplied to an ATM transmission processor 21n to perform a process for transmitting the ATM cell through the ATM network.

Figure 11:
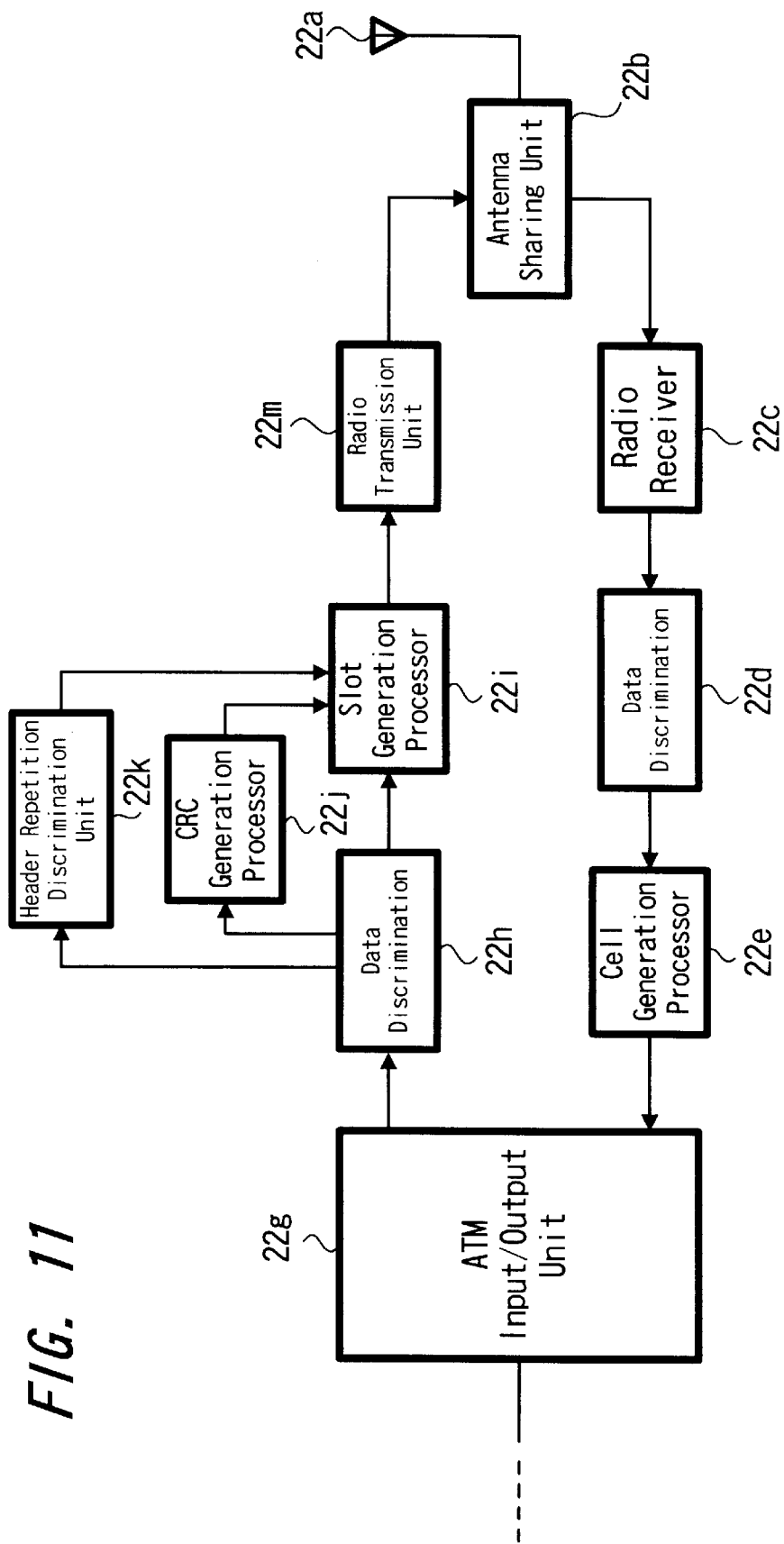
FIG. 11 is a block diagram showing the arrangement of a mobile station according to the second embodiment of the present invention.

The arrangement of the mobile station 22 will be described below with reference to FIG. 11. A terminal device 4 used to connect the mobile station 22 to the ATM network is connected to the mobile station 22 of this embodiment. In this mobile station 22, a radio receiver 22c connected to an antenna 22a through an antenna sharing unit 22b receives a radio signal having a predetermined frequency at a predetermined timing. Data included in the received signal is discriminated by a data discrimination unit 22d to discriminate data in reception slots. At this time, the data discrimination unit 22d performs an error detection process on the basis of an error detection signal (CRC) added to each slot. When an error is detected, the data discrimination unit 22d performs a correction process for a corresponding bit. The header information and the payload in the user information partition discriminated by the data discrimination unit 22d are supplied to a cell generation processor 22e, and the process of generating a cell for ATM network is performed. At this time, if the payload count discriminated by the data discrimination unit 22d is 2 or more, header information whose number is equal to the repetition count indicted by the data are added to the payloads to supply the resultant payloads to the cell generation processor 22e.

The cell generation processor 12e arranges the supplied header information and the supplied payload in the corresponding partitions 110 and 120 in the cell structure, respectively. The ATM cell generated by the cell generation processor 22e is supplied to an ATM input/output unit 22g and supplied as data (data in asynchronous transfer mode) having a cell arrangement transmitted to the terminal device 4 through the ATM network.

Data (data in asynchronous transfer mode) having a cell structure for ATM network supplied from the terminal device 4 to the ATM input/output unit 22g of the mobile station 22 is supplied to a data discrimination unit 22h, and header information and a payload are discriminated on the basis of the cell arrangement. The header information and the payload discriminated by the data discrimination unit 22h are supplied to a slot generation processor 22i. The slot generation processor 22i performs the process of arranging the supplied data into the data array of the slot arrangement shown in FIG. 9 described above. In this case, when an arithmetic operation process based on the header information and payload discriminated by the data discrimination unit 22h, control information added by the slot generation processor 22i, and the like is performed, a CRC generation processor 22j generates an error detection signal. The generated error detection signal is supplied to the slot generation processor 22i and arranged in the partition of the error detection signal (CRC) 306 consisting of last four bytes of each slot. In this embodiment, the mobile station 22 comprises a header repetition discrimination unit 22k for discriminating repetition of the header information discriminated by the data discrimination unit 22h. The repetition count data discriminated by the discrimination unit 22k is supplied to the slot generation processor 22i to be used as payload count data arranged in the slot. If it is determined on the basis of the payload count data that the header having the same contents is repeated twice or more, the slot generation processor 22i performs the process of omitting arrangement of the second and subsequent header information in the slot.

The slot generated by the slot generation processor 22i is supplied to a wireless transmission processor 22m, and the process of wireless-transmitting the slot at a predetermined frequency and a timing is performed. The slot is wireless-transmitted from the antenna 22a connected through the antenna sharing unit 22b.

In the radio base station 21 and the mobile station 22 arranged as describes, a signal having a cell structure transmitted through an ATM network is converted into a signal having a slot structure for wireless transmission, and the resultant signal is transmitted from the terminal device 1 side to the terminal device 4 side. The signal having the slot structure for wireless transmission is converted into a signal having a cell structure transmitted through the ATM network, and the resultant signal is also transmitted from the terminal device 4 side to the terminal device 1 side.

In this embodiment, the outline of the signal transmitted from the terminal device 1 to the terminal device 4 is shown in the lower side of FIG. 8. Cells 100a, 100b, . . . , transmitted from the terminal device 1 are received by the radio base station 21. Information of a payload count is added to a signal having a slot structure wireless-transmitted from the radio base station 21 to the mobile station 22. When the same header information is repeated (i.e., when the payload count is 2 or more), slots 410, 420, 430, . . . , having the arrangements shown in FIG. 9, from which the pieces of repeated header information are omitted are transmitted. The mobile station 22 determines repetition of header information on the basis of the payload count data added to the slots, and converts the cells into cells 100a, 100b, . . . , to which the pieces of header information are added to supply the resultant cells to the terminal device 4. In transmission from the terminal device 4 to the terminal device 1, the process opposite to the above process is performed.

In this embodiment, when the same information is repeated every cell as header information of the cell transmitted through the ATM network, transmission of repetition of the header information is omitted, and data representing the repetition count is added. For this reason, when the same header information is consecutive every cell, the amount of header information in wireless transmission can be reduced. Therefore, an amount of other information than the payload required to transmit the payload decreases by the amount of header information, a transmission rate of the payload becomes relatively high, and wireless transmission efficiency is improved.

In this embodiment, when the same header information is repeated, data of a payload count representing the repetition count is added. However, when the same header information is repeated in consecutive cells in place of the data of the payload count, transmission of header information of the second and subsequent cells is omitted, and a flag representing that the header information of the corresponding cell is the same as the header information of the previous cell is added before the payload of the second or subsequent cell. If the flag is on, the header information previously received by the reception side may be used. In any cases, the positions where the payload count and the flag are arranged are not limited to the positions described above.

Still another embodiment of the present invention will be described below with reference to FIG. 12.

In this embodiment, as in the first and second embodiments, an ATM communication network in which communication is performed in an asynchronous transfer mode is connected to a wireless communication network. The basic transmission arrangement is the same as that shown in FIGS. 1 and 8. In this embodiment, when wireless transmission is performed through the wireless communication network, header error control (HEC) added to header information of a cell of the ATM network described in the first embodiment is omitted. When the header information of the cell of the ATM network described in the second embodiment is repeated, the repetition is omitted.

As a signal transmitted through the ATM network in this embodiment, a signal having the cell structure shown in FIGS. 2 and 3 is used. A slot arrangement transmitted by a wireless transmission path in this embodiment is shown in FIG. 12. Here, wireless transmission between the radio base station 11 and the mobile station 12 is performed such that a slot having a fixed length is time-divisionally transmitted by a time division multiplex access (TDMA) scheme. Slots 510, 520, and 530 shown in FIG. 12 consists of 50 bytes by each slot. In the slots 510, 520, and 530, 4-byte preambles (PRs) 511, 521, and 531 for slot synchronization, 4-byte unique words (UWs) 512, 522, and 532 representing the starts of data, and 2-byte control signals (CACs) 513, 523, and 533 are sequentially arranged. The subsequent 36-byte partition is defined as a user information partition. Error detection signals (CRCs) 517, 526, and 538 are added to the partitions each consisting of last four bytes. The error detection signals are signals generated by an arithmetic operation for control signals (CACs) and data of the user information partitions to be added.

As data arranged in the user information partition, 4-byte header information portions 514 and 535 obtained by removing the header error control (HEC) from the header information portions of ATM cells each of which consists of 5 bytes are used. One-byte payload count data 515 and 536 representing the repetition counts of the header information portions are added to the portions next to the header information portions. More specifically, FIG. 12 illustrates a case wherein two ATM cells (first and second cells) have pieces of consecutive header information having the same contents. In this case, in the user information partition of the first slot 510, 4-byte header information 514 of the first cell is arranged, and a payload count 515 serving as information representing a period in which pieces of header information are consecutive is arranged. A first-half portion 516 of the payload of the first cell is arranged in the remaining partition.

In the user information partition of the next slot 520, a second-half portion 524 of the payload of the first cell and a first-half portion 525 of the payload of the second cell are arranged. A second-half portion 534 of the payload of the second cell is arranged in the user information partition of the next slot 530. The header information of the second cell is hot arranged before the payload of the second cell. Header information 535 of the next cell (third cell), a payload count 536, and two bytes of the first-half portion of the payload of the third cell are arranged in the remaining portion of the user information partition of the slot 530.

Figure 10:
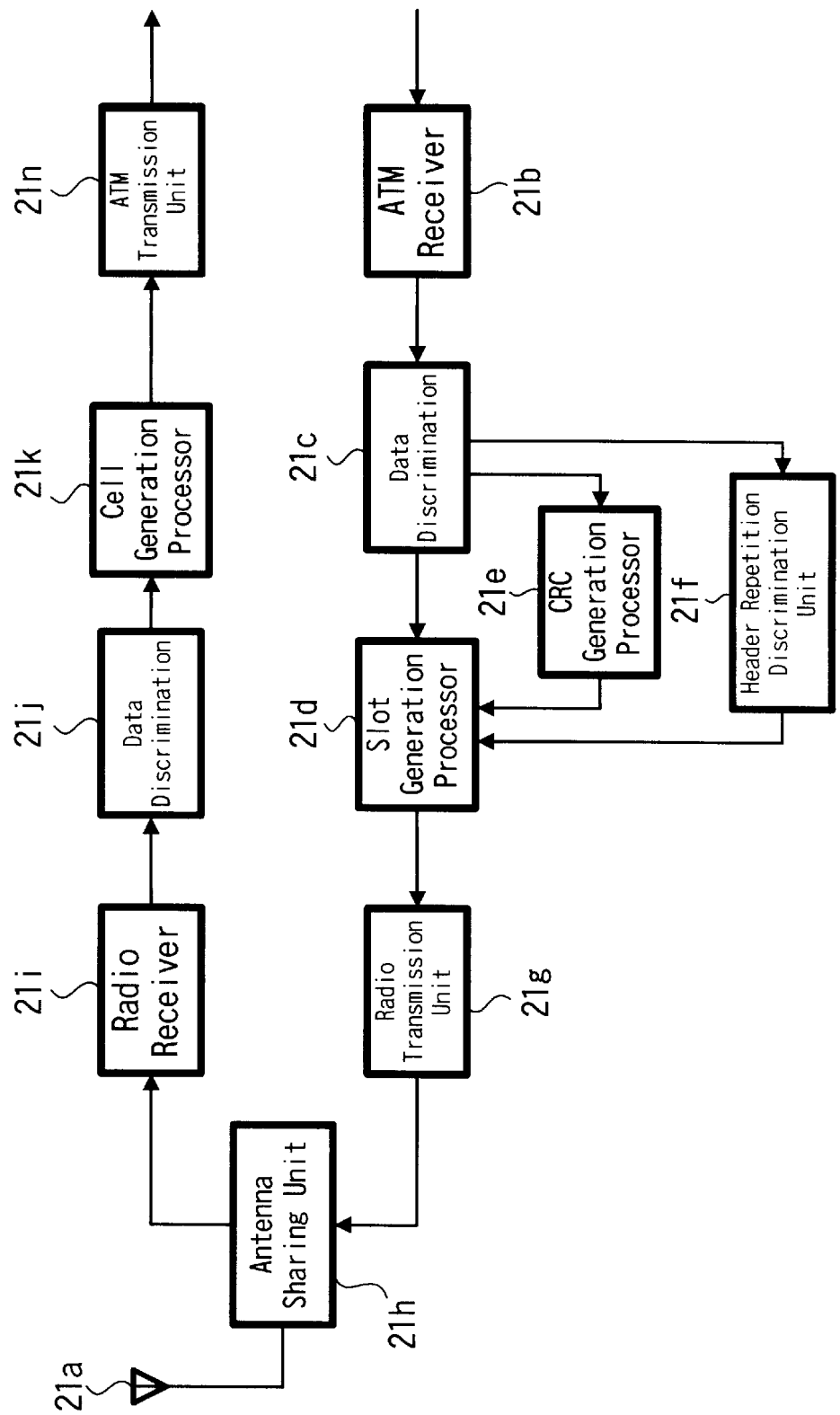
FIG. 10 is a block diagram showing the arrangement of a radio base station according to the second embodiment of the present invention.

As the process of performing wireless transmission with this slot arrangement, in the radio base station, in the arrangement in FIG. 10 described in the second embodiment, the process of removing header error control (HEC) of header information may be performed by a slot generation processor 21d serving as a wireless transmission processing system, and a processor (corresponding to an HEC generation processor 21k in FIG. 1) for generating header error control (HEC) may be arranged between a data determination unit 21i serving as a wireless reception processing system and the cell generation processor 21k. In the mobile station, in the arrangement in FIG. 11 described in the second embodiment, the process of removing header error control (HEC) of header information may be performed by a slot generation processor 22i serving as a wireless transmission processing system, and a processor (corresponding to the HEC generation processor 12f in FIG. 1) for generating header error control (HEC) may be arranged between a data determination unit 22d serving as a wireless reception processing system and a cell generation processor 12f.

The other parts are arranged in the same manner as that in the second embodiment described above.

Figure 12:
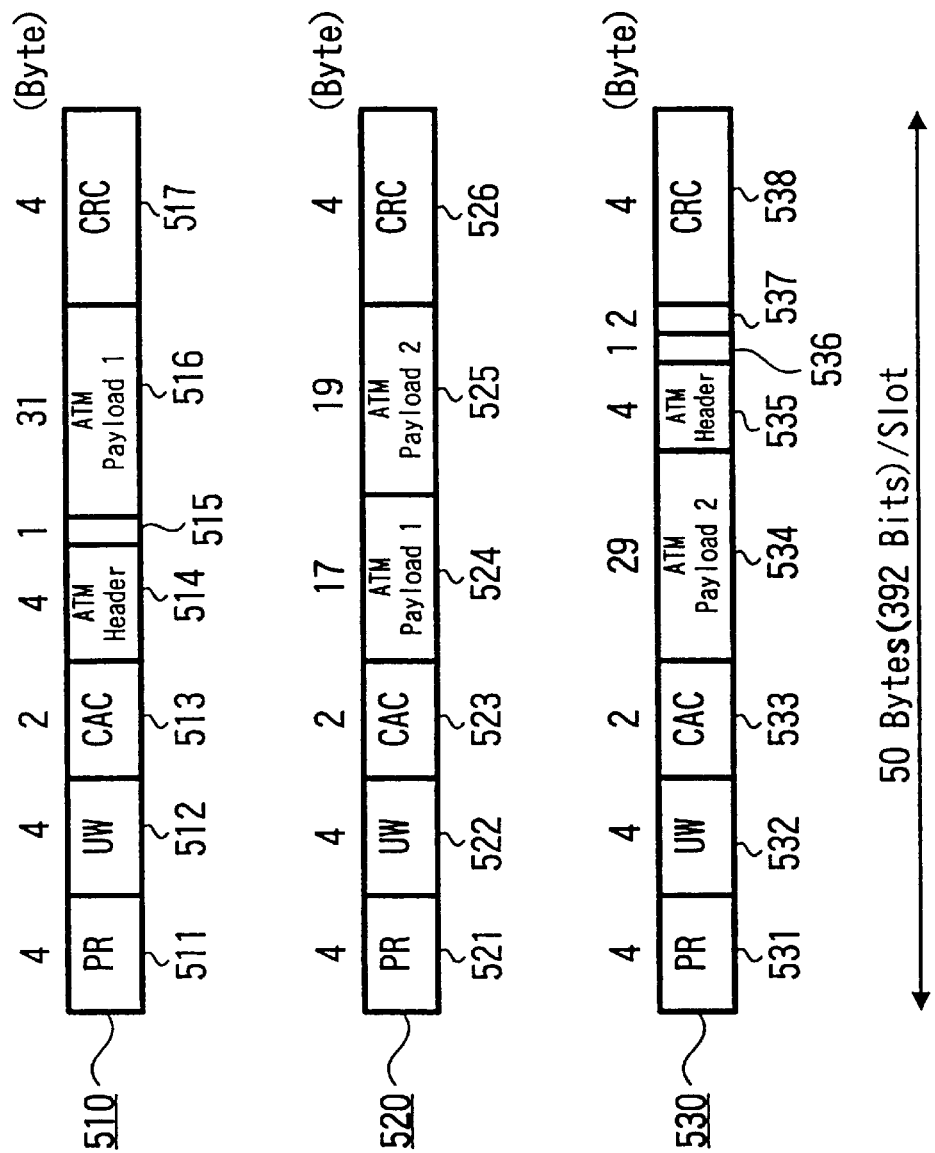
FIG. 12 is a view for explaining a slot format in the third embodiment of the present invention.
Figure 13:
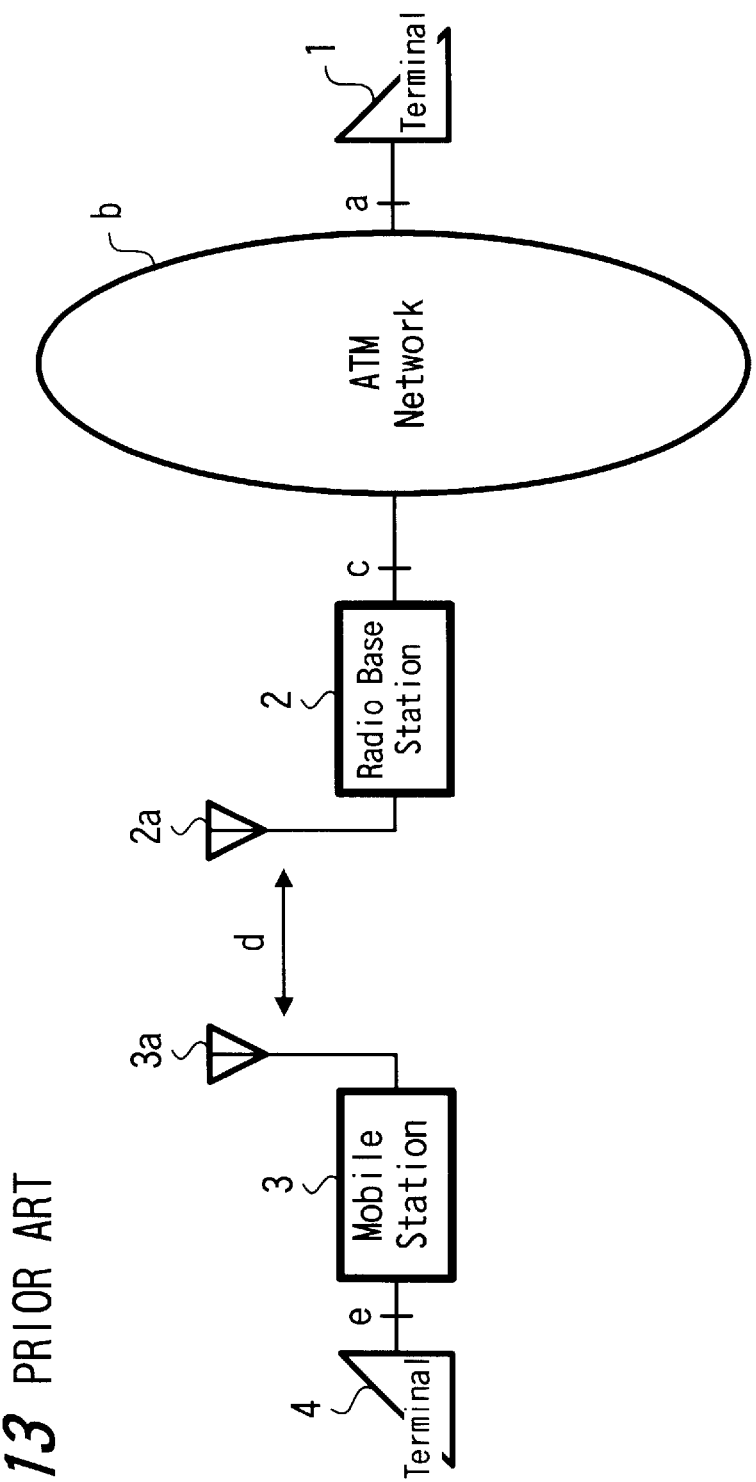
FIG. 13 is a block diagram showing an example of a conventional wireless ATM communication arrangement.
Figure 14:
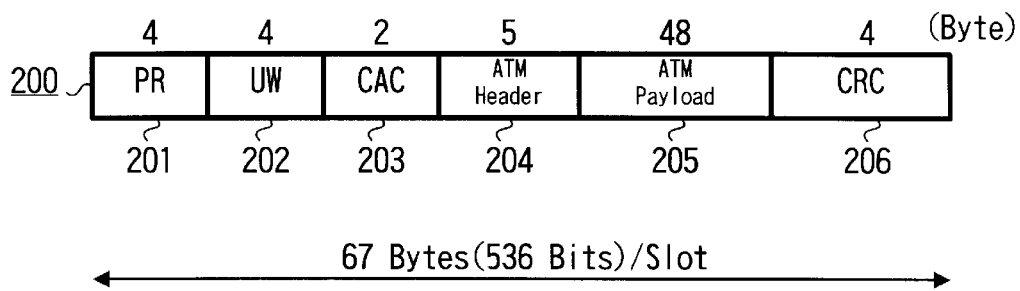
FIG. 14 is a view for explaining an example (1-slot arrangement) of a conventional slot format.
Figure 15:
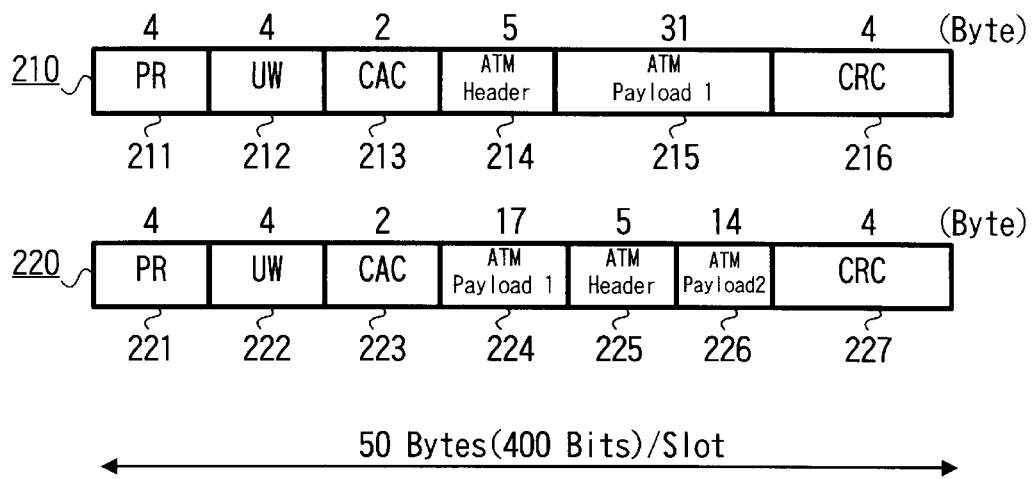
FIG. 15 is a view for explaining an example (2-slot arrangement) of a conventional slot format.

In this embodiment, the arrangement shown in FIG. 12 is used as a slot arrangement in wireless transmission, and information from which header error control information (HEC) is removed is used as header information for ATM network transmitted in a user information partition of a slot for wireless transmission. For this reason, an amount of header information in wireless transmission can be reduced by the amount of header error control information (HEC). When the same information is repeated every cell as header information of a cell transmitted through an ATM network, transmission of repetition of the header information is omitted, and data representing the repetition count is added. When the same header information is repeated every cell, the amount of header information in wireless transmission can be reduced. Therefore, an amount of other information than the payload required to transmit the payload decreases by the amount of header information, a transmission rate of the payload becomes relatively high, and wireless transmission efficiency is improved.

As the wireless transmission process in each of the above embodiments, a TDMA scheme for time-divisionally transmitting a signal having a slot arrangement is applied. However, the signal may be transmitted such that the data array is converted into a data array having a format regulated by another wireless transmission scheme. In addition, the cell arrangement and the slot arrangement are described as only examples. The types of arranged data, positions where the data are arranged, and the number of bits of each data are not limited to the examples described above.

In each of the embodiments described above, an ATM communication network in which communication is performed in an asynchronous transfer mode is connected to a wireless communication network. However, the present invention can also be applied to a case wherein another wire communication is connected to a wireless communication network, as a matter of course.

According to the communication method of the first aspect, in transmission by a wireless transmission path, an error detection signal for header information is removed, and an amount of other information than a payload decreases by the error detection signal, and wireless transmission efficiency in wireless transmission for a signal transmitted by a wire transmission path such as an ATM network is advantageously improved.

According to the communication method of the second aspect, in the invention according to the first aspect, an error detection signal generated to a signal of at least a user information partition is transmitted in a format for wireless transmission, the error detection signal of the header information is restored on the reception side of the radio signal on the basis of header information corrected by the error detection, and the restored error detection signal is added to the header information, so that a signal in a format for a wire transmission path can be preferably restored.

According to the communication method of the third aspect, in the invention according to the first aspect, when the same information is repetitively transmitted every predetermined unit a predetermined number of times as header information transmitted by a wire transmission path, a transmission amount of header information can be reduced by omitting transmission of the repeated header information in wireless transmission, a signal having an amount of other information than a payload which can be reduced by the reduced transmission amount is wireless-transmitted, and wireless transmission efficiency in wireless transmission for a signal transmitted by a wire transmission path such as an ATM network is advantageously improved.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A communication system, comprising:
    a transmission device including:
        first reception means for receiving a transmission signal of a first data amount unit of a first format having first header information including a first error correction signal and first user information, said transmission signal being transmitted by a first transmission path,
        transmission signal generation means for generating a transmission signal of a second data amount unit of a second format by adding a second error correction signal to the transmission signal of the second data amount unit including at least one of second header information and second user information, wherein information obtained by removing the first error correction signal from the first header information of the transmission signal of the first format received by the first reception means is used as the second header information and the first user information is used as the second user information, and wherein
            redundant first header information is omitted from the second header information based on a payload count representing a repetition count, and
        transmission means for transmitting the transmission signal of the second format to a second transmission path; and
    a reception device including
        second reception means for receiving the transmission signal of the second format transmitted by the second transmission path,
        error correction means for performing error correction for the transmission signal of the second data amount unit on the basis of the second error correction signal included in the transmission signal of the second format received by the second reception means,
        error correction signal generation means for generating a third error correction signal serving as an error correction signal for the second header information corrected by the error correcting means, and
        transmission signal generation means for generating the transmission signal of the first format from header information including the third error correction signal and the second user information.

2. A communication system according to claim 1, wherein the first transmission path is a wire transmission path, and the second transmission path is a wireless transmission path.

3. A communication system according to claim 1, wherein the transmission signal generation means adds the error correction signal for the signal of the second data amount unit as the second error correction signal to the signal of the second data amount unit including both the second header information and the second user information.

4. A communication system according to claim 1, wherein the transmission signal generation means generates the transmission signal of the second format while omitting at least one piece of second header information when the first user information included in the first data amount unit is divided as signals in the plurality of second data amount units which are different from each other and are consecutive with respect to the transmission signal of the second format.

5. A communication system according to claim 1, wherein the first format is an ATM format, and the second format is a wireless communication format.

6. A transmission device, comprising:
    first reception means for receiving a transmission signal of a first data amount unit of a first format having first header information including a first error correction signal and first user information, said transmission signal being transmitted by a first transmission path;
    transmission signal generation means for generating a transmission signal of a second data amount unit of a second format by adding a second error correction signal to the transmission signal of the second data amount unit including at least one of second header information and second user information, wherein information obtained by removing the first error correction signal from the first header information of the transmission signal of the first format received by the first reception means is used as the second header information and the first user information is used as the second user information, and wherein
        redundant first header information is omitted from the second header information based on a payload count representing a repetition count; and
    transmission means for transmitting the transmission signal of the second format to a second transmission path.

7. A transmission device according to claim 6, wherein the first transmission path is a wire transmission path, and the second transmission path is a wireless transmission path.

8. A transmission device according to claim 6, wherein the transmission signal generation means adds the error correction signal for the signal of the second data amount unit as the second error correction signal to the signal of the second data amount unit including both the second header information and the second user information.

9. A transmission device according to claim 6, wherein the transmission signal generation means generates the transmission signal of the second format while omitting at least one piece of second header information when the first user information included in the first data amount unit is divided as signals in the plurality of second data amount units which are different from each other and are consecutive with respect to the transmission signal of the second format.

10. A transmission device according to claim 6, wherein the first format is an ATM format, and the second format is a wireless communication format.

11. A reception device for receiving a transmission signal of a second format from a transmission device including
    A transmission device, comprising:
        first reception means for receiving a transmission signal of a first data amount unit of a first format having first header information including a first error correction signal and first user information, said transmission signal being transmitted by a first transmission path;
        transmission signal generation means for generating a transmission signal of a second data amount unit of a second format by adding a second error correction signal to the transmission signal of the second data amount unit including at least one of second header information and second user information, wherein information obtained by removing the first error correction signal from the first header information of the transmission signal of the first format received by the first reception means is used as the second header information and the first user information is used as the second user information; and redundant first header information is omitted from the second header information based on a payload count representing a repetition count, and wherein transmission means for transmitting the transmission signal of the second format to a second transmission path, said reception device comprising:

second reception means for receiving the transmission signal of the second format transmitted by the second transmission path;

error correction means for performing error correction for the transmission signal of the second data amount unit on the basis of the second error correction signal included in the transmission signal of the second format received by the second reception means;

error correction signal generation means for generating a third error correction signal serving as an error correction signal for the second header information corrected by the error correcting means; and transmission signal generation means for generating the transmission signal of the first format from header information including the third error correction signal and the second user information.

12. A reception device according to claim 11, wherein the first transmission path is a wire transmission path, and the second transmission path is a wireless transmission path.

13. A reception device according to claim 11, wherein the first format is an ATM format, and the second format is a wireless communication format.

14. A communication method between a transmission device and a reception device, comprising the steps of:

causing the transmission device to receive a transmission signal of a first data amount unit of a first format including first header information having a first error correction signal and first user information transmitted by a first transmission path;

causing the transmission device to generate a transmission signal of a second data amount unit of a second format by adding a second error correction signal to the transmission signal of the second data amount unit including at least one of second header information and second user information, wherein information obtained by removing the first error correction signal from the first header information of the transmission signal of the first format received by first reception means is used as the second header information and the first user information is used as the second user information, and wherein redundant first header information is omitted from the second header information based on a payload count representing a repetition count; and transmitting the transmission signal of the second format from the transmission device to a second transmission path;

causing the reception device to receive the transmission signal of the second format transmitted by the second transmission path;

causing the reception device to perform error correction for the transmission signal of the second data amount unit on the basis of the second error correction signal included in the transmission signal of the second format received by second reception means;

causing the reception device to generate a third error correction signal serving as an error correction signal for the second header information corrected by error correction means; and causing the reception device to generate the transmission signal of the first format from header information including the third error correction signal and the second user information.

15. A transmission device, comprising:

a reception unit for receiving header information and user information transmitted as a signal of a first format by a first wire transmission path;

a determination unit for determining that the header information is repeated each of a plurality of predetermined units by the reception unit;

a transmission data generation unit for arranging the header information and the user information received by the reception unit in a user information partition of a second format appropriate for a second wireless transmission path to generate transmission data, and for omitting second and subsequent arrangement of header information when the determination unit determines repetition of the header information based on a payload count representing a repetition count; and a transmission unit for transmitting the transmission data generate by the transmission data generation unit to the second transmission path.

* * * * *